(12) United States Patent
Corrie

(10) Patent No.: US 8,001,541 B2
(45) Date of Patent: Aug. 16, 2011

(54) SYSTEM AND METHOD FOR MATCHING OF CLASSPATHS IN A SHARED CLASSES SYSTEM

(75) Inventor: Benjamin John Corrie, London (GB)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 11/557,990

(22) Filed: Nov. 9, 2006

(65) Prior Publication Data

US 2007/0169072 A1    Jul. 19, 2007

(30) Foreign Application Priority Data

Nov. 10, 2005   (GB) .................................. 0522938.0

(51) Int. Cl.
*G06F 9/44* (2006.01)

(52) U.S. Cl. ........ 717/166; 717/116; 717/118; 717/162; 717/164; 717/165

(58) Field of Classification Search ........................ None
See application file for complete search history.

(56) References Cited

U.S. PATENT DOCUMENTS

| | | | | |
|---|---|---|---|---|
| 6,738,977 | B1 * | 5/2004 | Berry et al. | 719/332 |
| 7,526,760 | B1 * | 4/2009 | Daynes et al. | 717/153 |
| 7,644,402 | B1 * | 1/2010 | Daynes et al. | 717/166 |
| 7,665,075 | B1 * | 2/2010 | Daynes et al. | 717/148 |
| 7,721,277 | B1 * | 5/2010 | Thyagarajan et al. | 717/166 |
| 2003/0097360 | A1 * | 5/2003 | McGuire et al. | 707/8 |
| 2004/0019887 | A1 * | 1/2004 | Taylor et al. | 717/166 |
| 2004/0039926 | A1 | 2/2004 | Lambert | |
| 2006/0059156 | A1 * | 3/2006 | Janes et al. | 707/9 |
| 2006/0070051 | A1 * | 3/2006 | Kuck et al. | 717/162 |
| 2006/0101446 | A1 * | 5/2006 | Mariani et al. | 717/166 |
| 2006/0179428 | A1 * | 8/2006 | Kawachiya et al. | 717/148 |
| 2007/0061796 | A1 * | 3/2007 | Atsatt | 717/166 |
| 2010/0070957 | A1 * | 3/2010 | Mariani et al. | 717/148 |

\* cited by examiner

*Primary Examiner* — Insun Kang
(74) *Attorney, Agent, or Firm* — Winstead, P.C.

(57) ABSTRACT

A system 300 and method for fast matching of JAVA classpaths in a shared classes JVM system by identifying classpaths of loaded classes and storing a local array (110, 210) of identified classpaths in order to avoid checking on a subsequent class load for a particular JVM. This allows dramatic speeding up of class-loading in cases where multiple JVMs are running similar applications.

18 Claims, 2 Drawing Sheets

SYSTEM AND METHOD FOR MATCHING OF CLASSPATHS IN A SHARED CLASSES SYSTEM

FIELD OF THE INVENTION

Figure 1:
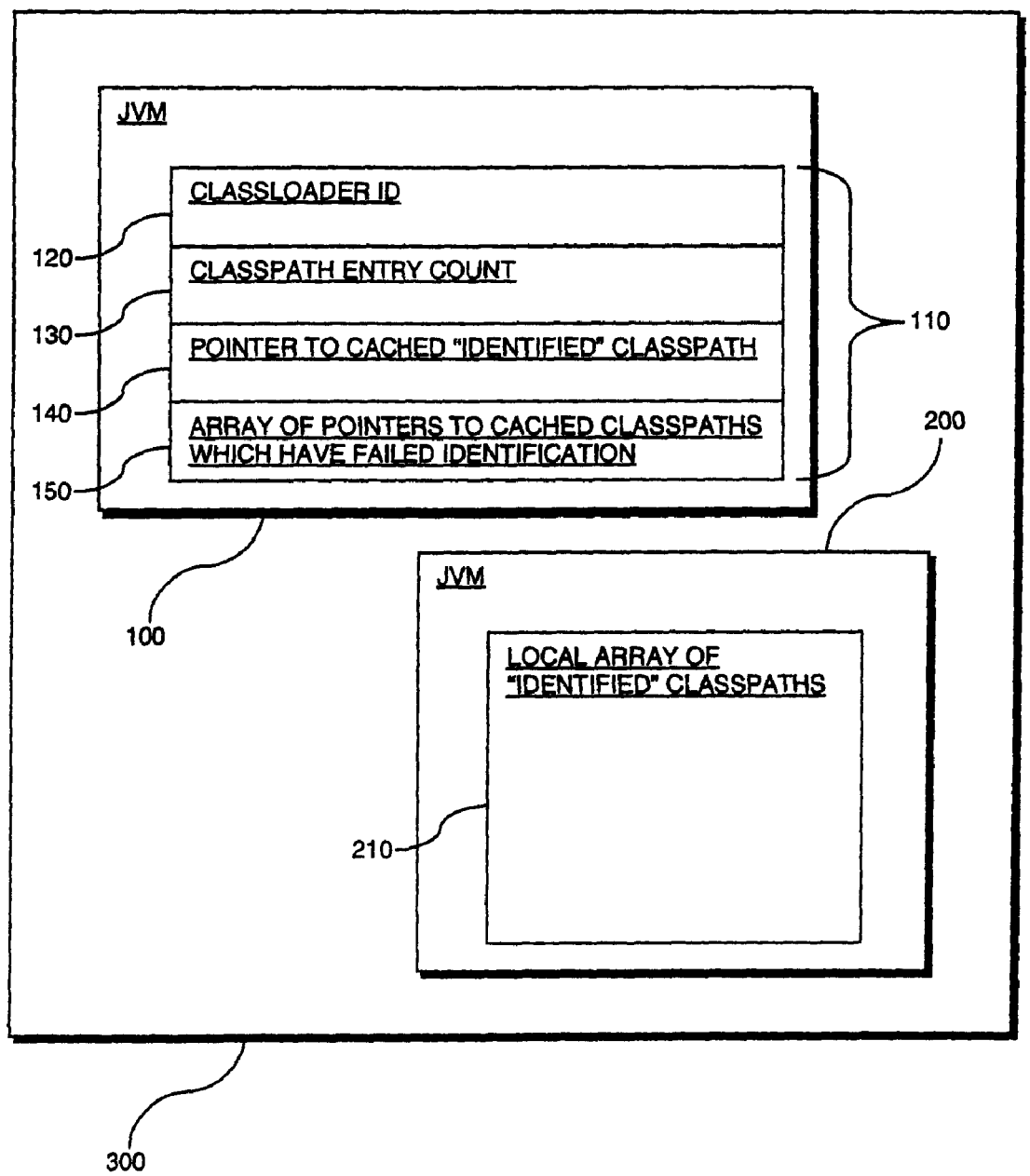

This invention relates to object-oriented programs in which classpath matching of shared classes is required.

BACKGROUND OF THE INVENTION

It is known that programs written in the JAVA programming language (JAVA is a trademark of Sun Microsystems Inc) are generally run in a virtual machine environment, rather than directly on hardware. Thus a JAVA program is typically compiled into byte-code form, and then interpreted by a JAVA virtual machine (JVM) into hardware command for the platform on which the JVM is executing. The JVM itself is an application running on the underlying operating system. An important advantage of this approach is that JAVA applications can run on a very wide range of platforms, providing of course that a JVM is available for each platform.

JAVA is an object-oriented language. Thus a JAVA program is formed from a set of class files having methods that represent sequences of instructions (somewhat akin to subroutines). A hierarchy of classes can be defined, with each class inheriting properties (including methods) from those classes which are above it in the hierarchy. For any given class in the hierarchy, its descendants (i.e. below it) are called subclasses, whilst its ancestors (i.e. above it) are called superclasses.

At run-time classes are loaded into the JVM by one or more class loaders, which themselves are organized into a hierarchy. In JAVA, classes are loaded into the JVM's local memory at application runtime, typically in accordance with a 'classpath'. The classpath defines a search order of locations (directories or JAR—JAVA archive—files) from which classes can be loaded, and a class located at a location earlier in the classpath is loaded before a class located at a location later in the classpath. Once loaded, a class is used from the JVM's local memory rather than reloading for each reference. A JVM can also execute with a shared class cache (i.e., a cache storing classes shared between the JVMs), in which case the classes are loaded into the shared class cache and shared between multiple JVMs. This reduces duplication of read-only data stored in local memory. Objects can then be created as instantiations of these class files. One JAVA object can call a method in another JAVA object. In recent years JAVA has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

Multiple JVMs can execute with a shared class cache—that is a cache storing classes shared between the JVMs. Where one or more JVMs are sharing Java classes in a shared memory area (shared cache), if any classloader from any JVM is allowed to store and find classes in the cache, then a system of classpath validation/matching must be employed (when a classloader loads classes from disk, it will try to load the class from each entry in its classpath until it finds the class it is looking for). When a classloader tries to load a class from the shared cache, it is typically quicker to first find the class/classes by name and then determine if the path from which they were originally loaded is valid for the classpath of the caller classloader. This is resource intensive at runtime.

Known implementations of similar systems circumvent this issue in various ways. One known way is to have a shared memory area for each classloader, which then places restrictions on sharing (only another JVM with the same classloader with the same classpath can share the classes). Another known way is that of the Class Data Sharing (CDS) system of Sun Microsystems, Inc., which is based on a read-only file which contains all system classes and cannot be updated.

U.S. patent publication 2004/0039926 discloses the use of hash values to identify modified Java class files, but does not address the matching problem discussed above.

A need therefore exists for system and method for fast matching of classpaths in a shared classes system wherein the above mentioned disadvantage(s) may be alleviated.

SUMMARY OF THE INVENTION

In accordance with a first aspect of the present invention there is provided a system for matching of classpaths in a shared classes system as claimed in claim 1.

In accordance with a second aspect of the present invention there is provided a method of matching classpaths in a shared classes system as claimed in claim 7.

BRIEF DESCRIPTION OF THE DRAWING(S)

Figure 2:
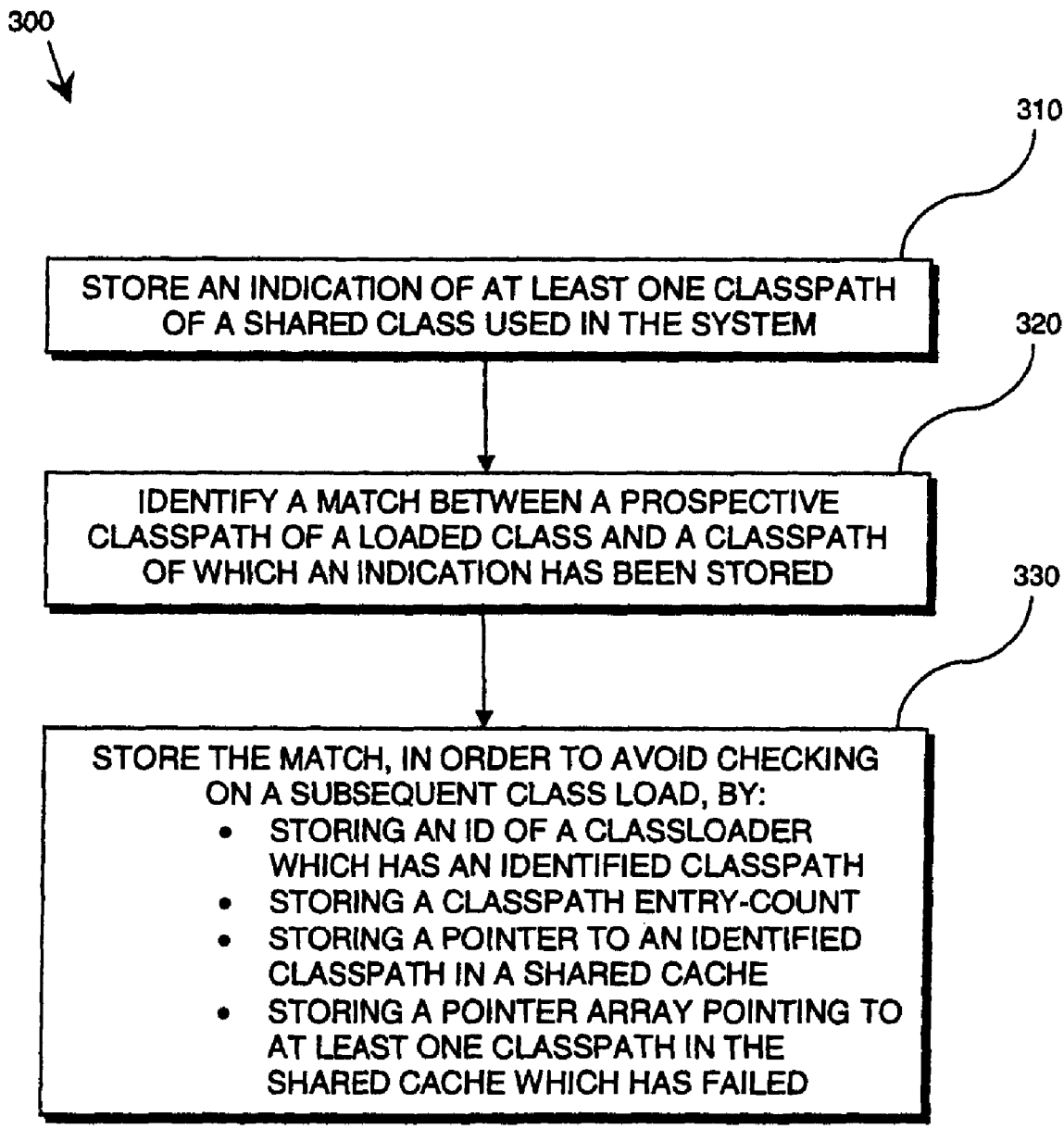

One system and method for fast matching of JAVA classpaths in a shared classes system incorporating the present invention will now be described, by way of example only, with references to the accompanying drawing(s), in which:

FIG. 1 shows a block-schematic diagram illustrating a multiple JVM system; and FIG. 2 shows a block diagram illustrating the method.

DESCRIPTION OF PREFERRED EMBODIMENT(S)

Classes need to be stored in the shared cache against the classpath of the classloader which loaded them, so that the cache knows where they were loaded from. Both the class and its classpath are stored in the shared cache, although the classpath is stored only once (many classes can be stored using the same classpath). Stored classes have a reference to the stored classpath of the classloader which loaded them and each class has an index into that classpath indicating the file-system path that it was loaded from.

Once a class has been stored in the cache, a classloader from the same JVM or another JVM may make a request to find that class. Finding the class by name is a simple hash-table lookup, although there may be multiple classes of the same name in the cache. Once a class (or classes) have been found, they are only returned if the classpath of the caller classloader "matches" the classpath that the class is stored against. The definition of a "match" is the following:

Given the caller classloader classpath c1, the classpath of the classloader which stored the shared class c2, and the classpath entry k in c2 that the shared class was originally loaded from: k must exist as a classpath entry in c1 and there must be no classpath entries in c1 up to the index of k in c1 which do not exist in c2 up to the index of k in c2. Proving this match can be costly. It involves string-matching each classpath entry up to the index of k in c1, and in a worst-case scenario this would need to be done for each shared class which matches the requested name. For example, a JVM loading 10,000 classes using 10 classloaders, each with a classpath containing 300 entries could potentially end up having to perform up to 30,000,000 string-matching operations, which would be very costly indeed.

Clearly this only becomes a significant issue with long classpaths, but since one of the expected benefits of using a shared cache of classes is quicker loading, performance is critical and string matching at the level described above is not acceptable. Use of string hashing is helpful to prove that classpaths are not equal, but since hashcodes do not guarantee uniqueness, byte-for-byte comparison must be done to prove equality. Thus, it is much quicker to compare non-matching classpaths and therefore the scenario where known classpaths are being repeatedly used is not only the most expensive, but also likely to be the most common (consider multiple JVMs running the same application—they will all be using the same classpaths).

As mentioned above, known implementations of similar systems circumvent this issue in various ways, e.g., by having a shared memory area for each classloader which then places restrictions on sharing (only another JVM with the same classloader with the same classpath can share the classes) or by using a read-only file which contains all system classes and cannot be updated.

As will be explained in greater detail below, the present invention provides, at least in its preferred embodiment, a novel system which has a fully cooperative class cache that allows any classloader from any JVM to populate or read from the cache.

The system of the preferred embodiment undertakes equivalence checking, and where equivalence is proven, this equivalence is recorded to avoid undertaking such checking on subsequent class-loads for a particular JVM.

The system of the preferred embodiment attempts to identify "known" classpaths which exist in the shared cache, to save the effort of repeatedly matching them. Essentially, once the JVM has proved that a classpath in one of its classloaders is identical to a classpath in the cache, the JVM "remembers" this match, so that it only has to be done once. Since proving equality of identical classpaths is much more intensive (and therefore expensive in computer time) than proving inequality of non-identical classpaths, this is a crucial optimization.

The advantage of this scheme is that it dramatically speeds up class-loading in cases where multiple JVMs are running similar applications. The scheme applies to a system where co-operative sharing in a single area of memory is employed, with no restrictions on classloader access to the cache.

Referring to FIG. 1, there will now be described a preferred embodiment of the invention, based on the following technical assumptions:

Java Classloader has a classpath which can be appended to only (cannot be modified in any other way)

This is only of benefit if one or more of the classpaths stored in the cache are the same as one or more of the classpaths in the caller classloaders (the bootstrap classloader at least will almost always be the same)

A hashcode can be generated from a classpath, which does not guarantee uniqueness, but can at least prove that two classpaths are not the same.

The nature of classpaths in classloaders is that they rarely change. If they do change, they can only ever be appended to. Therefore, if each classloader in a JVM is assigned a unique ID, then a combination of this ID and the number of entries ("entry-count") in its classpath provides a unique key that guarantees a classpath which cannot change. If the classpath is appended to, the entry-count changes, which changes the unique key.

It is this guarantee of an appendable class path, tied to a unique key, which allows optimization of the scenario where known classpaths exist in the shared cache.

In the system of the preferred embodiment, a plurality of JVMs, of which only two, 100 and 200, are shown in FIG. 1. The JVMs run on a computer system shown as 300. Each JVM 100 or 200 maintains a local array 110 or 210 of known or "identified" classpaths, which is effectively a local cache. When the JVM starts up, this array is empty. A classpath in the shared cache is "identified" if it can be exactly matched to a classpath in one of the classloaders in a JVM. When a classpath is identified, it is added to this array—the array index being the ID of the classloader it matches. The overall purpose of this is to link classloaders with classpaths in the share cache. It should be noted that the classloaders ID is only used locally within the JVM, so the same classloader in two different JVMs may have different IDs.

Each entry in the array 110 contains the following data:
The ID 120 of the classloader which has this classpath (which matches the array element)
The classpath entry-count 130
A pointer 140 to the actual "identified" classpath in the shared cache
Optionally, a list of pointers 150 to classpaths in the shared cache which have failed identification for this ID/entry-count combination.

For simplicity, only the array 110 in the JVM 100 is discussed in detail, but it will be appreciated that the array 210 of the JVM 200 is similarly arranged. It will be understood that each array element in the local array 110 of identified classpaths contains the four items of data described.

Classpaths are "identified" in the following manner: When a class is being STORED in the shared cache by a classloader with classpath c1, it needs to be determined whether c1 has already been stored in the shared cache. If it has not, c1 needs to be added. This is determined as follows:

First, given the classloader ID and its classpath entry-count, look to see if there is an entry for it in the "identified' array (see 'getidentifiedclasspath' below).
If there is an entry for it, check that the entry-count matches that of c1.
If the entry-count matches, the classpath in the cache has been found.
If the entry-count does not match, c1 has been updated and the "identified" classpath is now out of date. Clear the entry in the array and proceed as if there were no entry (see 'clearidentifiedclasspath' below).
If there is no entry for it, explicitly check (using hashing and string-comparison) to see if the classpath exists in the cache.
If it does, add it to the "identified" array at the index of the caller classloader's ID (see 'setIdentifiedclasspath' below).
If it does not, add it to the shared cache and "identify" it next time around.

When a classloader (with classpath c1) makes a request to FIND a class in the cache, and a class has been found, the classpath the class was stored against (c2) needs to be matched against c1. First, given a pointer to c2, search to see if there is an entry for it in the "identified" array (see 'getID-ForIdentified' below).
If there is no entry for c2, go ahead with normal matching algorithm using string-comparison: generate/obtain a hashcode value for c1 and one for c2.
If the hash values match and if c1 and c2 have the same number of entries, attempt to "identify" c2 by string-comparing every entry of both classpaths.

If all the entries match and are in the same order, store this identified classpath in the array at the index of the caller classloader's ID (see 'setIdentifiedclasspath' below).

If they do not match, optionally add this classpath to the list of failed attempts in the array entry for this classloader.

This ensures that there is not more tan one failed attempt to identify a classpath for a given ID/entry-count.

If there is an entry for c2, this classpath has been "identified" or matched previously. If the array index of the pointer to c2 matches the ID of the caller classloader AND the entry-count is the same, there is no need to do any further checks as both classpaths match.

Therefore, by linking classpaths in the cache to classpaths in JVM classloaders, a byte-for-byte comparison of a classpath should occur only once for each time the classpath in the classloader changes. In most circumstances, this will be once per classloader lifetime.

Referring now to FIG. 2, the method 400 used for fast matching of JAVA classpaths in the shared classes system of FIG. 1 is as follows:

at step 410, an indication is stored of at least one classpath of a shared class used in the system, at step 420, a match is identified between a prospective classpath of a loaded class and a classpath of which an indication has been stored, and at step 430, the match is stored (in order to avoid checking on a subsequent class load) by:

storing an ID of a classloader which has an identified classpath, storing a classpath entry-count, storing a pointer to an identified classpath in a shared cache, and preferably, storing a pointer array pointing to at least one classpath in the shared cache which has failed identification.

For reference, the following is an example C programming language implementation interface of the preferred embodiment of the invention (without the optional "failed attempts" feature):

```
struct ClasspathByiD {
int id;
int entryCount;
void* classpathInCache;
};
/* Returns an initialized empty array */
struct ClasspathByID** initializeIdentifiedClasspath(int elements);
/* Clears an entry in the array - used if a classpath has been
updated and the entry is no longer valid */
    void clearIdentifiedClasspath(struct ClassspathByID** theArray, int
arrayLength, void* classpathInCache);
    /* Returns a pointer to a classpath in the cache (if it exists) for a
given ID and entry-count */
    void* getIdentifiedClasspath(struct ClasspathByID** theArray, int
arrayLength, int loaderID, int entryCount);
    /* Given & pointer to a classpath in the cache, searches to see if
there is an ID for it in the array */
    IDATA getIDForIdentified(struct ClasspathbyID** theArray, int
arrayLength, void* classpathInCache);
    /* If a classpath is identified, this sets the array element with
this information. If entryCount >= arrayLength, the array has to be grown,
the data is copied to the new array and theArrayPtr then refers to the new
array. */
    int setIdentifiedClasspath(struct ClasspathByID*** theArrayPtr, int
arrayLength, int loaderID, int entryCount, void* classpathInCache);
```

It will be appreciated that the scheme for fast matching of JAVA classpaths in a shared classes system described above is carried out in software running on a processor in one or more computers, and that the software may be provided as a computer program element carried on any suitable data carrier (not shown) such as a magnetic or optical computer disc.

It will be understood that the system and method for fast matching of JAVA classpaths in a shared classes system described above provides the following advantages:

dramatically speeds up class-loading in cases where multiple JVMs are running similar applications.

The invention claimed is:

1. A system having a processor for matching of classpaths in a shared classes system, comprising:

means for storing an indication of at least one classpath of a shared class used in the system;

means for identifying a match between a prospective classpath of a loaded class and a classpath of which an indication has been stored; and means for storing the match in order to avoid checking on a subsequent class load.

2. The system of claim 1 wherein the means for storing the match comprises means for storing:

an ID of a classloader which has an identified classpath;

a classpath entry-count; and a pointer to an identified classpath in a shared cache.

3. The system of claim 1 wherein the means for storing the match further comprises a pointer array pointing to at least one classpath in the shared cache which has failed identification by the means for identifying.

4. The system of claim 1 wherein the system comprises a JAVA system.

5. The system of claim 4 wherein the system comprises a JAVA Virtual Machine system.

6. The system of claim 5 wherein the system comprises a cooperative cache for storing shared classes, the cache being arranged to be populated or read from by each of a plurality of JAVA Virtual Machines.

7. A computer-implemented method of matching classpaths in a shared classes system, the method comprising:

storing an indication of at least one classpath of a shared class used in the system;

identifying a match between a prospective classpath of a loaded class and a classpath of which an indication has been stored; and storing the match in order to avoid checking on a subsequent class load.

8. The method of claim 7 wherein the step of storing the match comprises storing:

an ID of a classloader which has an identified classpath;

a classpath entry-count; and a pointer to an identified classpath in a shared cache.

9. The method of claim 7 further comprising storing a pointer array pointing to at least one classpath in the shared cache which has failed identification by the means for identifying.

10. The method of claim 7 wherein the system comprises a JAVA system.

11. The method of claim 10 wherein the system comprises a JAVA Virtual Machine system.

12. The method of claim 11 wherein the system comprises a cooperative cache for storing shared classes, the cache being arranged to be populated or read from by each of a plurality of JAVA Virtual Machines.

13. A computer program product embodied in a computer readable storage medium for matching classpaths in a shared classes system, the computer program product comprising the programming instructions for:
- storing an indication of at least one classpath of a shared class used in the system;
- identifying a match between a prospective classpath of a loaded class and a classpath of which an indication has been stored; and
- storing the match in order to avoid checking on a subsequent class load.

14. The computer program product as recited in claim 13, wherein the programming instructions for storing the match comprises the programming instructions for storing:
- an ID of a classloader which has an identified classpath;
- a classpath entry-count; and
- a pointer to an identified classpath in a shared cache.

15. The computer program product as recited in claim 13 further comprising the programming instructions for:
- storing a pointer array pointing to at least one classpath in the shared cache which has failed identification by the means for identifying.

16. The computer program product as recited in claim 13, wherein the system comprises a JAVA system.

17. The computer program product as recited in claim 16, wherein the system comprises a JAVA Virtual Machine system.

18. The computer program product as recited in claim 17, wherein the system comprises a cooperative cache for storing shared classes, the cache being arranged to be populated or read from by each of a plurality of JAVA Virtual Machines.

* * * * *